United States Patent
Ueno et al.

(10) Patent No.: US 10,605,825 B2
(45) Date of Patent: Mar. 31, 2020

(54) ELECTRONIC DEVICE, CORRECTION CONTROL METHOD AND NON-TRANSITORY STORAGE MEDIUM

(71) Applicant: KYOCERA Corporation, Kyoto-shi, Kyoto (JP)

(72) Inventors: Yasuhiro Ueno, Yokohama (JP); Shigeki Tanabe, Yokohama (JP); Hideki Morita, Yokohama (JP); Isao Masuike, Machida (JP); Koutaro Yamauchi, Yokohama (JP); Manabu Sakuma, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 151 days.

(21) Appl. No.: 15/838,403

(22) Filed: Dec. 12, 2017

(65) Prior Publication Data
US 2018/0164340 A1    Jun. 14, 2018

(30) Foreign Application Priority Data

Dec. 13, 2016  (JP) ................................. 2016-241307

(51) Int. Cl.
  *G01P 21/00*  (2006.01)
  *H04M 1/00*  (2006.01)
  *G06F 3/041*  (2006.01)

(52) U.S. Cl.
CPC .............. *G01P 21/00* (2013.01); *H04M 1/00* (2013.01); *G06F 3/0416* (2013.01); *G06F 2203/04108* (2013.01); *H04M 2250/10* (2013.01); *H04M 2250/12* (2013.01)

(58) Field of Classification Search
CPC ..... G01P 21/00; H04M 1/00; H04M 2250/10; H04M 2250/12; G06F 2203/04108; G06F 3/0416

USPC .......................................................... 73/1.37
See application file for complete search history.

(56) References Cited

U.S. PATENT DOCUMENTS

| 5,433,107 A | * | 7/1995 | Angermaier | ........... G01M 15/11 |
| | | | | 73/114.03 |
| 6,282,959 B1 | * | 9/2001 | Blake | .................. G01P 15/0802 |
| | | | | 73/504.16 |
| 2004/0261547 A1 | * | 12/2004 | Russell | ..................... F17D 5/00 |
| | | | | 73/865.8 |
| 2014/0150543 A1 | * | 6/2014 | Shima | ................. B60C 23/0416 |
| | | | | 73/146 |

(Continued)

FOREIGN PATENT DOCUMENTS

| JP | H10-307032 A | 11/1998 |
| JP | 2006-107657 A | 4/2006 |
| JP | 2014-038003 A | 2/2014 |

OTHER PUBLICATIONS

Office Action dated Aug. 1, 2016, issued in counterpart Japanese Application No. 2016-241307.

*Primary Examiner* — Marrit Eyassu
(74) *Attorney, Agent, or Firm* — Procopio Cory Hargreaves and Savitch LLP

(57) ABSTRACT

An electronic device includes a first sensor, a second sensor, and a controller configured to determine whether the electronic device is in a predetermined state based on a detection result of the first sensor. The controller is configured to, if it is determined that the electronic device is in the predetermined state, refrain from changing a correction value used to correct a detection error in the second sensor.

9 Claims, 6 Drawing Sheets

(56) References Cited

U.S. PATENT DOCUMENTS

2015/0219683 A1\* 8/2015 Schueler ................. G01P 21/00
                                                            73/1.38
2018/0067469 A1\* 3/2018 Shinoda ............... G05B 19/404

\* cited by examiner

ELECTRONIC DEVICE, CORRECTION CONTROL METHOD AND NON-TRANSITORY STORAGE MEDIUM

CROSS-REFERENCE TO RELATED APPLICATION

The present application claims priority under 35 U.S.C. § 119 to Japanese Patent Application No. 2016-241307, filed on Dec. 13, 2016, entitled "ELECTRONIC DEVICE, CORRECTION CONTROL METHOD AND NON-TRANSITORY STORAGE MEDIUM". The content of which is incorporated by reference herein in its entirety.

FIELD

The present application relates to an electronic device, a correction control method and a non-transitory storage medium.

BACKGROUND

There are conventional electronic devices each of which has an acceleration sensor.

SUMMARY

An electronic device according to one embodiment includes a first sensor, a second sensor, and a controller configured to determine whether the electronic device is in a predetermined state based on a detection result of the first sensor. The controller is configured to, if it is determined that the electronic device is in the predetermined state, refrain from changing a correction value used to correct a detection error in the second sensor.

A correction control method of an electronic device according to one embodiment includes a first sensor and a second sensor. The correction control method includes steps of determining whether the electronic device is in a predetermined state based on a detection result of the first sensor, and if it is determined that the electronic device is in the predetermined state, refraining from changing a correction value used to correct a detection error in the second sensor.

An electronic device according to another embodiment includes a first sensor, a second sensor, and a controller configured to determine whether the electronic device is in a predetermined state based on a detection result of the first sensor. The controller is configured to, if it is determined that the electronic device is in the predetermined state when a correction value used to correct a detection error in the second sensor is changed, change the correction value again.

DETAILED DESCRIPTION

Embodiments for the electronic device, the correction control method and the non-transitory storage medium according to the present application will be described in detail with reference to the accompanying drawings. The conventional electronic devices may admit of improvement in a method of changing a correction value used to correct an error in detection by the acceleration sensor.

A smartphone will be described below as an example of the electronic device according to the present application. The electronic device may be any device other than smartphones as long as it utilizes an acceleration sensor for various types of control. For example, the electronic device may be, for example, a mobile phone, a tablet, a portable personal computer, a digital camera, a media player, an electronic book reader, a navigator, a pedometer, an activity monitor, a wearable device, a head mounted display, a hearing aid, earphones, or a game machine. The wearable device includes ones in the forms of, for example, a watch, eyeglasses, shoes, a hairpin, a key, a neckless, a collar, a ring, a bracelet and a bag.

Figure 1:
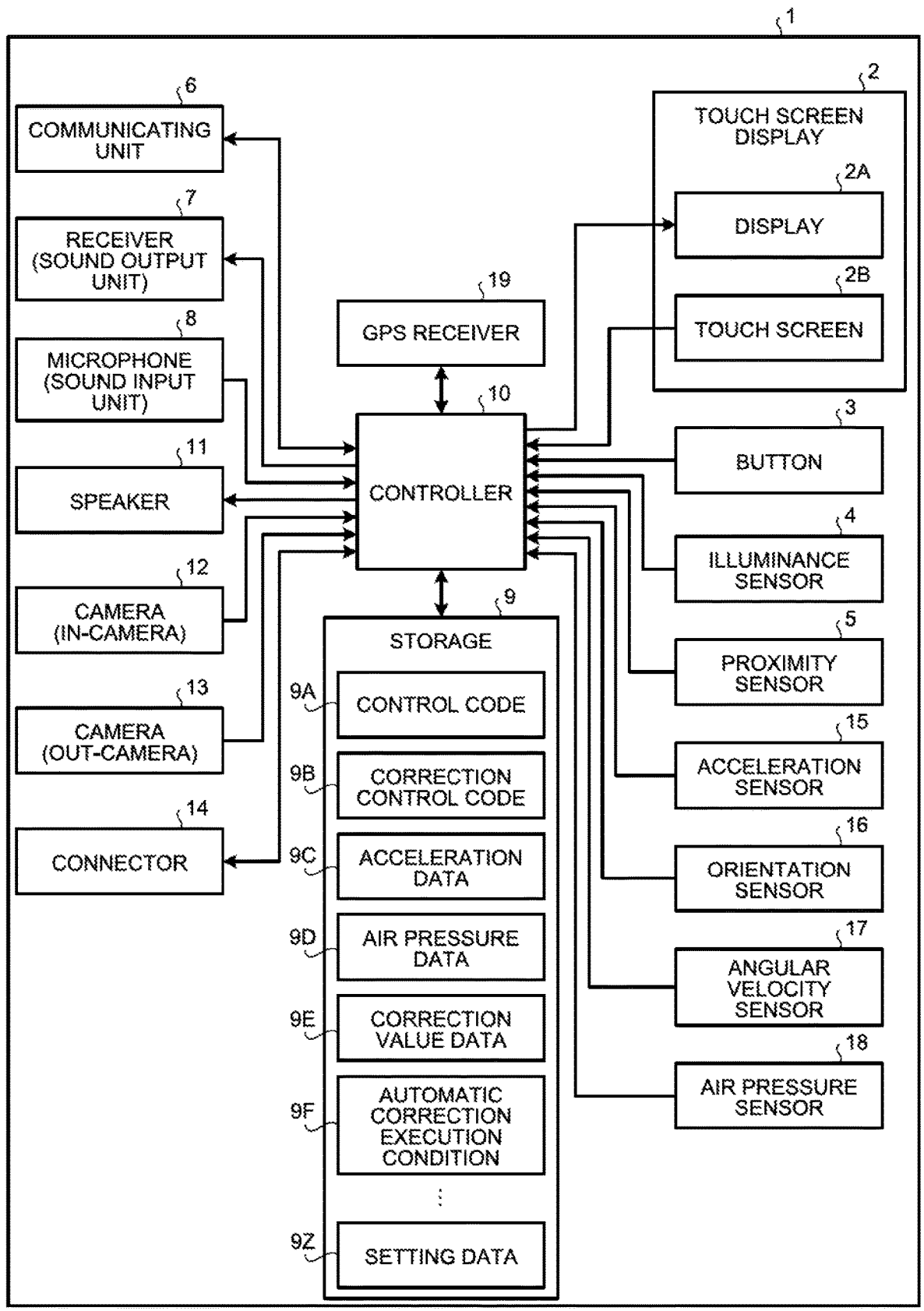
FIG. 1 is a block diagram illustrating an exemplary functional configuration of a smartphone according to an embodiment of the disclosure.

FIG. 1 is a block diagram illustrating an exemplary functional configuration of a smartphone according to an embodiment. In the following descriptions, the same components may be denoted with the same reference numeral. In the following descriptions, redundant descriptions may be omitted.

As illustrated in FIG. 1, a smartphone 1 includes a touch screen display 2, a button 3, an illuminance sensor 4, a proximity sensor 5, a communicating unit 6, a receiver 7, a microphone 8, a storage 9, a controller 10, a speaker 11, a camera 12, a camera 13, a connector 14, an acceleration sensor 15, an orientation sensor 16, an angular velocity sensor 17, an air pressure sensor 18, and a GPS receiver 19.

The touch screen display 2 includes a display 2A and a touch screen 2B. For example, the display 2A and the touch screen 2B may be positioned in a layered manner, may be positioned side-by-side, or may be positioned separately. When the display 2A and the touch screen 2B are positioned in a layered manner, for example, at least one of the sides of the display 2A need not be along any of the sides of the touch screen 2B.

The display 2A includes a display device, such as a liquid crystal display (LCD), an organic electro-luminescence display (OELD) or an inorganic electro-luminescence display (IELD). The display 2A displays an object, such as characters, images, symbols or diagrams, in a screen. The screen containing the object displayed by the display 2A includes a screen that is referred to as a lock screen, a screen referred to as a home screen, and an application screen that is displayed during execution of an application. The home screen may be also referred to as a desktop, an idle screen, a standby screen, a standard screen, an application list screen or a launcher screen.

The touch screen 2B detects that a finger, a pen, a stylus pen or the like is in contact with or proximate to the touch screen 2B. The touch screen 2B is able to detect the positions on the touch screen 2B at which fingers, the pen, the stylus pen or the like is/are in contact with or proximate to the touch screen 2B. In the following descriptions, the position at which the fingers, the pen, the stylus pen or the like is/are in contact with or proximate to the touch screen 2B, which is detected by the touch screen 2B, will be referred to as a "detection position". The touch screen 2B notifies the controller 10 of the state that the fingers are in contact with or proximate to the touch screen 2B, together with the detection position. The touch screen 2B may notify the controller 10 of the contact or the proximity by notifying the controller 10 of the detection position. The touch screen display 2 including the touch screen 2B is able to execute operations that the touch screen 2B is able to perform. In other words, the touch screen display 2 may perform the operations performed by the touch screen 2B.

The controller 10 determines the type of the gesture based on at least one of contact or the proximity detected by the touch screen 2B, the detection position, a change of the detection position, a duration of the contact or the proximity, the time interval between the detected contacts or the detected proximities, and the number of detected contacts. The smartphone 1 including the controller 10 is able to execute operations that the controller 10 is able to perform. In other words, the smartphone 1 may perform the operations performed by the controller 10. The gesture is an operation performed on the touch screen 2B with the fingers. An operation performed on the touch screen 2B may be performed on the touch screen display 2 including the touch screen 2B. Examples of the gesture determined by the controller 10 via the touch screen 2B include, but are not limited to, touch, long touch, release, swipe, tap, double tap, long tap, drag, flick, pinch-in, pinch-out, etc.

The detection method of the touch screen 2B may be any method, such as a capacitance method, a resistance film method, a surface acoustic wave method, an infrared method or a load sensing method.

The button 3 accepts an operation input from a user. The button 3 may include a single button or multiple buttons. The button 3 is an exemplary operation button.

The illuminance sensor 4 detects illuminance. The illuminance is a value of a flux of light incident on a unit area of a measurement surface of the illuminance sensor 4. The illuminance sensor 4 is, for example, used to adjust luminance of the display 2A.

The proximity sensor 5 is able to detect in a non-contact manner that an object is present in the vicinity thereof. The proximity sensor 5 detects the presence of an object based on, for example, a change in the magnetic field or a change in a return time of a reflective wave of ultrasound. The illuminance sensor 4 and the proximity sensor 5 may be configured as a single sensor. The illuminance sensor 4 may be used as a proximity sensor.

The communicating unit 6 communicates wirelessly. Examples of a wireless communication standard supported by the communicating unit 6 include, but are not limited to, communication standards for 2G, 3G, 4G and 5G cellular phones, and communication standards for short range wireless communication. Examples of cellular phone communication standards include, but are not limited to, LTE (Long Term Evolution), W-CDMA (trademark) (Wideband Code Division Multiple Access), CDMA2000, PDC (Personal Digital Cellular), GSM (trademark) (Global System for Mobile Communications), and PHS (Personal Handy-phone System). Examples of the wireless communication standards for short range wireless communication include, but are not limited to, WiMAX (trademark) (Worldwide interoperability for Microwave Access), IEEE802.11, Bluetooth (trademark), IrDA (Infrared Data Association), NFC (trademark) (Near Field Communication), and WPAN (Wireless Personal Area Network). The communicating unit 6 may support at least one of the communication standards listed above.

The receiver 7 outputs, as sound, a sound signal that is transmitted from the controller 10. The microphone 8 converts, for example, input voice of the user into sound signals and transmits the sound signals to the controller 10.

The storage 9 stores codes and data. The storage 9 may be used as a work area in which results of processes performed by the controller 10 are temporarily stored. The storage 9 may include a semiconductor storage medium and a non-transitory storage medium, such as a magnetic storage medium. The storage 9 may include multiple types of storage media. The storage 9 may include a combination of a storage medium, such as a memory card, an optical disk or a magneto-optical disk, and a storage-medium read device. The storage 9 may include a storage device that is used as a temporary storage area, such as a random access memory (RAM).

The codes stored in the storage 9 include an application that is executed on the foreground or the background and a support code that supports operations of the application (not illustrated in the drawings). The application, for example, when executed on the foreground, displays a screen according to the application on the display 2A. The support code includes, for example, an OS. The code may be installed in the storage 9 via wireless communications by the communicating unit 6 or a non-transitory storage medium.

The storage 9 is able to store a control code 9A, a correction control code 9B, acceleration data 9C, air pressure data 9D, correction value data 9E, an automatic correction execution condition 9F, and setting data 9Z, etc.

The control code 9A enables provision of functions relating to operations of the smartphone 1. The control code 9A may be linked up with various types of codes and applications when providing various functions. For example, the control code 9A enables provision of a function of determining a travel mode of the smartphone 1 from the detection result of the acceleration sensor 15. The control code 9A notifies the correction control code 9B of the result indicating the determined travel mode of the smartphone 1. The control code 9A may be linked up with a cloud storage via the communicating unit 6 and access a file and data that are stored in the cloud storage. The cloud storage may store part or all of codes and data stored in the storage 9.

Under the condition that the automatic correction execution condition 9F is satisfied, the correction control code 9B enables provision of a function for executing calibration to cancel a detection error (offset) occurring in the acceleration sensor 15 according to, for example, the method disclosed in Japanese Laid-open Patent Publication No. 2015-224939 A. The correction control code 9B enables provision of a function for controlling a change of the correction value used for calibration when calibration is executed. In other words, in an exemplary embodiment, if it is determined that the travel mode of the smartphone 1 is a first mode based on the detection result of the air pressure sensor 18, the correction control code 9B enables the use of the correction value used for the previous calibration without changing the correction value used to correct the detection error in the acceleration sensor 15.

The correction control code 9B enables calculation of an air pressure variation in a certain period of time based on the air pressure data 9D and enables determination on whether the travel mode of the smartphone 1 is the first mode based on the calculated air pressure variation. For example, the correction control code 9B makes it possible to determine that the travel mode is the first mode if the air pressure variation exceeds 0.3 hPa (hectopascals) in three seconds. The first mode is a mode where an unintended acceleration is applied to the smartphone 1. The mode where an unintended acceleration is applied to the smartphone 1 includes a uniform accelerated motion mode where the smartphone 1 in the travel mode travels with a given acceleration, at least as part of the travel mode. If the smartphone 1 is in a uniform accelerated motion mode, it is considered that the air pressure sensor 18 detects a pressure variation different from a variation of the atmospheric pressure, and therefore, it is possible to determine whether the travel mode of the smartphone 1 is the first mode based on the pressure variation.

The acceleration data 9C contains the value of the acceleration detected by the acceleration sensor 15. The acceleration data 9C contains the direction and magnitude of the acceleration applied to the smartphone 1. The acceleration data 9C may contain all measurement results acquired by the acceleration sensor 15. For example, the acceleration data 9C may contain an acceleration pattern formed by time series variations in the direction and magnitude of the acceleration. For example, in a case where the acceleration sensor 15 is a 3-axis sensor that detects accelerations in an X-axis direction, a Y-axis direction and a Z-axis direction, the acceleration data 9C may contain the direction and magnitude of acceleration in each of the axes and a synthesized vector obtained by synthesizing the accelerations in the three axes.

The acceleration data 9C may contain data for determining the travel mode, which is used to determine the travel mode of the smartphone 1. For example, the acceleration data 9C may contain, for each of travel modes of the user of the smartphone 1 such as walking, running, traveling by bicycle, and traveling by vehicle such as automobile or train, a direction and a magnitude of acceleration, an acceleration pattern, and a synthesized vector in association with each of the travel modes. The control code 9A makes it possible to determine the travel mode of the smartphone 1 from the detection result of the acceleration sensor 15 by using the direction and magnitude of acceleration, the acceleration patter and the synthesized vector in association with the travel modes.

The air pressure data 9D contains the value of the air pressure detected by the air pressure sensor 18. The air pressure data 9D may contain an air pressure variation per unit of time. The air pressure variation may be an absolute value or a value obtained by accumulation of scalar quantities. The unit of time may be any duration of time allowing the smartphone 1 to execute the process efficiently.

The correction value data 9E is data about the correction value used to correct the detection error in the acceleration sensor 15. The correction value data 9E contains at least the data of the correction value used for the previous calibration.

The automatic correction execution condition 9F contains a condition for enabling automated execution of calibration that cancels the detection error occurring in the acceleration sensor 15. The automatic correction execution condition 9F includes a condition that the smartphone 1 is in the travel mode. The automatic correction execution condition 9F further includes a condition that each of the accelerations applied to the smartphone 1 in the X-axis direction, the Y-axis direction, and the Z-axis direction is equal to or smaller than a given value. The automatic correction execution condition 9F further includes a condition that the average of the accelerations over a certain period of time in the two axes other than the axis in which a detection error occurs is equal to or smaller than a given value. In other words, the calibration is started automatically, under the automatic correction execution condition 9F that the smartphone 1 is in the travel mode and is kept unmoved and an acceleration detection error occurs in only one of the axes and errors occurring in other two axes are ignorable.

The setting data 9Z contains information about various types of setting relating to operations of the smartphone 1.

The controller 10 includes an arithmetic processing device. Examples of the arithmetic processing device include, but are not limited to, a central processing unit (CPU), a system-on-a-chip (SoC), a micro control unit (MCU), a field-programmable gate array (FPGA), a coprocessor, etc. The controller 10 integrally controls operations of the smartphone 1 to implement various functions.

Specifically, the controller 10 is able to execute commands that are contained in the codes stored in the storage 9 with reference to the data stored in the storage as required. The controller 10 controls a function unit according to the data and commands, and accordingly implements various types of functions. Examples of the function unit include, but are not limited to, the display 2A, the communicating unit 6, the microphone 8, the speaker 11, and the GPS receiver 19, etc. The controller 10 may change the control according to the detection result of a detector. Examples of the detector include, but are not limited to, the touch screen 2B, the button 3, the illuminance sensor 4, the proximity sensor 5, the microphone 8, the camera 12, the camera 13, the acceleration sensor 15, the orientation sensor 16, the angular velocity sensor 17, and the air pressure sensor 18.

By executing the control code 9A, the controller 10 is able to achieve various types of control relating to operations of the smartphone 1.

By executing the correction control code 9B, the controller 10 is able to achieve various types of control relating to calibration that cancels the detection error occurring in the acceleration sensor 15. For example, if it is determined that the travel mode of the smartphone 1 is the first mode based on the detection result of the air pressure sensor 18 on execution of calibration, the controller 10 is able to implement control to refrain from changing the correction value used to correct the detection error in the acceleration sensor 15.

The speaker 11 outputs, as sound, a sound signal that is transmitted from the controller 10. The speaker 11 is used to output, for example, ringtone and music. One of the receiver 7 and the speaker 11 may double as the other.

The camera 12 and the camera 13 convert a captured image into electronic signals. The camera 12 is an in-camera that images an object facing the display 2A. The camera 13 is an out-camera that images an object facing the face opposite to the display 2A. The camera 12 and the camera 13 may be integrated functionally and physically, and mounted on the smartphone 1 as a camera unit switchable for the in-camera and the out-camera.

The connector 14 is a terminal to which another device is connected. The connector 14 may be a general-purpose terminal, such as a universal serial bus (USB), a high-definition multimedia interface (HDMI) (trademark), a mobile high-dimension link (MHL), a light peak, a thunderbolt (trademark), a local area network connector (LAN connector), or an earphone/microphone connector. The connector 14 may be a dedicated terminal, such as a Dock connector. Examples of the device connected to the connector 14 include, but are not limited to, a battery, an external storage, a speaker, a communication device, and information processing device.

The acceleration sensor 15 is able to detect the direction and magnitude of the acceleration applied to the smartphone 1. In an exemplary embodiment, it is possible to use the 3-axis acceleration sensor 15 that detects accelerations in the X-axis direction, the Y-axis direction and the Z-axis direction. The acceleration sensor 15 may consist of a piezo-resistive sensor, a capacitance sensor, a piezoelectric element sensor (piezoelectric sensor), a thermal-detection type micro electro mechanical systems (MEMS) sensor, a servo sensor in which a moving coil that has been operated is reset with a feedback current, a distortion gauge sensor or the like. The acceleration sensor 15 outputs the detection result to the controller 10. The controller 10 is able to execute various types of control according to the detection result of the acceleration sensor 15. For example, when the gravitational force applied to the smartphone 1 is output as acceleration from the acceleration sensor 15, the controller 10 is able to execute control reflecting the direction of the gravity applied to the smartphone 1.

The orientation sensor 16 is able to detect the geomagnetic orientation. The orientation sensor 16 outputs the detection result to the controller 10. The controller 10 is able to execute various types of control according to the detection result of the orientation sensor 16. For example, the controller 10 is able to specify the orientation of the smartphone 1 from the geomagnetic orientation and execute control reflecting the specified orientation of the smartphone 1.

The angular velocity sensor 17 is able to detect the angular velocity of the smartphone 1. The angular velocity sensor 17 outputs the detection result to the controller 10. The controller 10 is able to execute various types of control according to the detection result of the angular velocity sensor 17. For example, the controller 10 is able to achieve control reflecting the rotation of the smartphone 1 according to whether there is an angular velocity that is output from the angular velocity sensor 17.

The controller 10 is not limited to the case where each of the detection results of the acceleration sensor 15, the orientation sensor 16 and the angular velocity sensor 17 is used individually. The detection results may be used in combination.

The air pressure sensor 18 is able to detect the air pressure applied to the smartphone 1. The detection result of the air pressure sensor 18 may contain an air pressure variation per unit of time. The air pressure variation may be an absolute value or a value obtained by accumulation of scalar quantities. Any duration of time may be set for the unit of time. The air pressure sensor 18 outputs the detection result to the controller 10. As described above, the controller 10 is able to achieve control relating to calibration that cancels the detection error occurring in the acceleration sensor 15 according to the detection result of the air pressure sensor 18.

The GPS receiver 19 is able to receive radio signals of a given frequency band from GPS satellites. The GPS receiver 19 performs a process of demodulating the received radio signals and transmits the processed signals to the controller 10.

The smartphone 1 may include a vibrator. The vibrator vibrates part of or the whole smartphone 1. The vibrator includes, for example, a piezoelectric element or an eccentric motor in order to cause vibrations. Other than the above sensors, the smartphone 1 may include, for example, a temperature sensor, a humidity sensor, and a pressure sensor. The smartphone 1 mounts a function unit that is used inevitably to maintain the functions of the smartphone 1, such as a battery, and a detector that is used inevitably to achieve the control on the smartphone 1.

Figure 2:
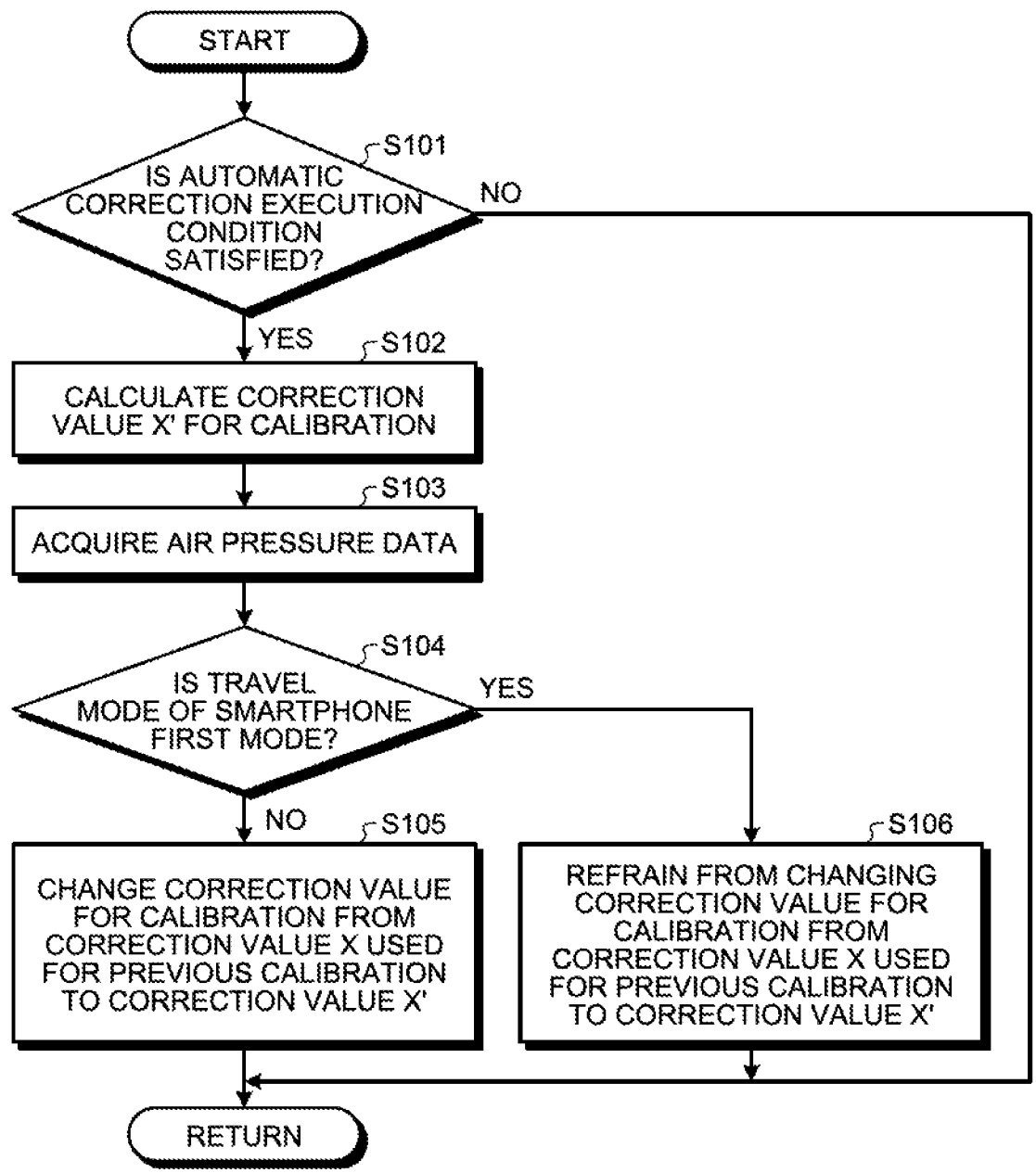
FIG. 2 is a flowchart illustrating an exemplary process that is executed by the smartphone according to an embodiment of the disclosure.

With reference to FIG. 2, the process executed by the smartphone 1 according to an embodiment will be described. FIG. 2 is a flowchart illustrating an exemplary process executed by the smartphone according to an embodiment. The controller 10 executes the control code 9A and the correction control code 9B that are stored in the storage 9, thereby implementing the process illustrated in FIG. 2. The process illustrated in FIG. 2 is executed repeatedly when the smartphone 1 is in an operable mode. In other words, the smartphone 1 may repeatedly execute the process illustrated in FIG. 2 also in a mode where power supply control is partly limited, that is, in a power-saving mode.

As illustrated in FIG. 2, the controller 10 determines whether the automatic correction execution condition is satisfied (Step S101).

If the determination result indicates that the automatic correction execution condition is not satisfied (NO at Step S101), the controller 10 repeats the determining process of Step S101.

On the other hand, if the determination result indicates that the automatic correction execution condition is satisfied (YES at Step S101), the controller 10 calculates a correction value X' for calibration (Step S102).

After calculating the correction value X' for calibration, the controller 10 acquires the air pressure data 9D from the storage 9 (Step S103).

Based on the air pressure data 9D acquired at Step S103, the controller 10 determines whether the travel mode of the smartphone 1 is the first mode (Step S104).

If the determination result indicates that the travel mode of the smartphone 1 is not the first mode (NO at Step S104), the controller 10 changes the correction value for calibration from a correction value X used for the previous calibration to the correction value X' (Step S105) and returns to the determining process of Step S101.

On the other hand, if the determination result indicates that the travel mode of the smartphone 1 is the first mode (YES at Step S104), the controller 10 refrains from changing the correction value for calibration from the correction value X used for the previous calibration to the correction value X' (Step S106) and returns to the determining process of Step S101.

According to the process illustrated in FIG. 2, if the travel mode of the smartphone 1 is the first mode, the controller 10 refrains from changing the correction value for calibration from the correction value X used for the previous calibration to the correction value X'. In other words, in the smartphone 1, it is possible to avoid calibration using the correction value calculated in the mode where an unintended acceleration is applied to the smartphone 1 from being performed on the acceleration sensor 15.

A modification of the process performed by the smartphone 1 to change the correction value for calibration will be described.

The correction control code 9B enables provision of a function of, if it is determined that the travel mode of the smartphone 1 is not the first mode, changing the correction value for calibration under the condition that the absolute value of the difference between the correction value X used for the previous calibration and the correction value X' that is newly calculated is equal to or larger than a given value.

The controller 10 is able to, if the controller 10 executes the correction control code 9B and accordingly determines that the travel mode of the smartphone 1 is not the first mode, change the correction value for calibration under the condition that the absolute value of the difference between the correction value X used for the previous calibration and the correction value X' that is newly calculated is equal to or larger than a given value.

Figure 3:
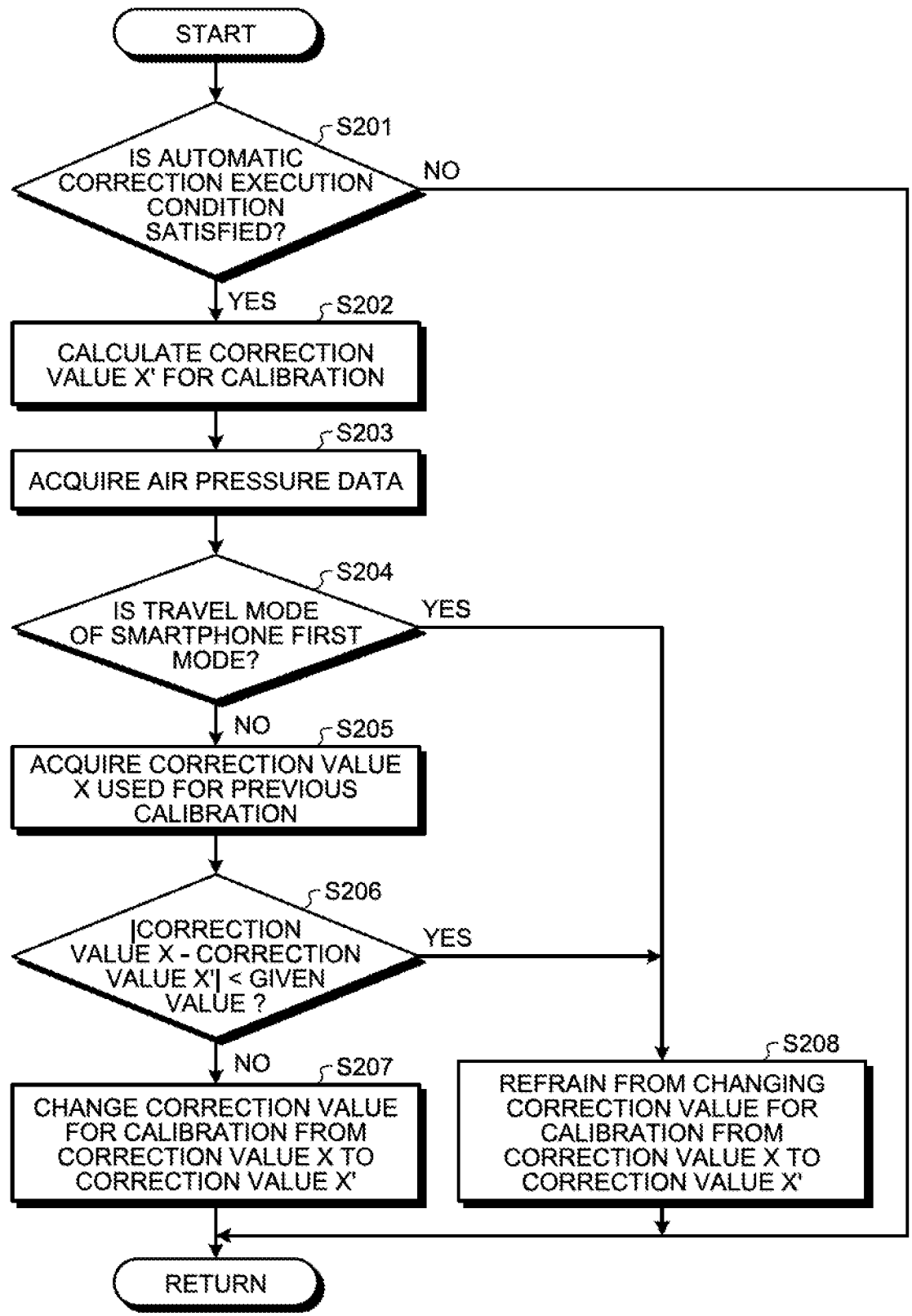
FIG. 3 is a flowchart illustrating another exemplary process that is executed by the smartphone according to an embodiment of the disclosure.

With reference to FIG. 3, a process executed by the smartphone 1 according to an embodiment will be described. FIG. 3 is a flowchart illustrating another exemplary process that is executed by the smartphone according to an embodiment. The controller 10 executes the control code 9A and the correction control code 9B that are stored in the storage 9, thereby achieving the process illustrated in FIG. 3. The process illustrated in FIG. 3 is different from the process illustrated in FIG. 2 in the aspect that the process includes Step S205 and Step S206.

As illustrated in FIG. 3, the controller 10 determines whether the automatic correction execution condition is satisfied (Step S201).

If the determination result indicates that the automatic correction execution condition is not satisfied (NO at Step S201), the controller 10 repeats the determining process of Step S201.

On the other hand, if the determination result indicates that the automatic correction execution condition is satisfied (YES at Step S201), the controller 10 calculates a correction value X' for calibration (Step S202).

After calculating the correction value X' for calibration, the controller 10 acquires the air pressure data 9D from the storage 9 (Step S203).

Based on the air pressure data 9D acquired at Step S203, the controller 10 determines whether the travel mode of the smartphone 1 is the first mode (Step S204).

If the determination result indicates that the travel mode of the smartphone 1 is not the first mode (NO at Step S204), the controller 10 acquires a correction value X used for the previous calibration from the correction value data 9E stored in the storage 9 (Step S205).

The controller 10 then calculates the difference between the correction value X that is acquired at Step S205 and the correction value X' that is calculated at Step S202 and determines whether the absolute value of the calculated difference is smaller than a given value (Step S206).

If the absolute value of the difference between the correction value X and the correction value X' is not smaller than the given value according to the determination result (NO at Step S206), that is, if there is a large difference between the correction value X and the correction value X', the controller 10 changes the correction value for calibration from the correction value X used for the previous calibration to the correction value X' (Step S207) and returns to the determining process of Step S201 described above.

If the determination result indicates that the absolute value of the difference between the correction value X and the correction value X' is smaller than the given value (YES at Step S206), that is, if there is not much difference between the correction value X and the correction value X', the controller 10 refrains from changing the correction value for calibration from the correction value X used for the previous calibration to the correction value X' (Step S208) and returns to the determining process of Step S201 described above.

At Step S204, if the determination result indicates that the travel mode of the smartphone 1 is the first mode (YES at Step S204), the controller 10 proceeds to the process of Step S208 described above.

According to the process illustrated in FIG. 3, if there is not much difference between the correction value X' for calibration, which is newly calculated, and the correction value X used for the previous calibration, the smartphone 1 refrains from changing the correction value. For this reason, the smartphone 1 is able to reduce errors occurring in the correction value due to updating the correction value each time calibration is executed.

In the process illustrated in FIGS. 2 and 3, if it is determined that the automatic correction execution condition 9F is satisfied, the smartphone 1 may acquire the detection result of the air pressure sensor 18 before calculating the correction value X' and determine whether the travel mode of the smartphone 1 is the first mode. Accordingly, if the correction value X' is unnecessary, it is possible to exclude the unnecessary calculation of the correction value X'.

Some embodiments as described above illustrate the example where, before the correction value for calibration is changed, it is determined whether to execute changing the correction value based on the travel mode of the smartphone 1; however, embodiments are not limited thereto. For example, after the correction value is changed, whether to change the correction value again may be determined based on the travel mode of the smartphone 1 when the correction value is changed.

The correction control code 9B enables provision of a function of, if it is determined that the travel mode of the smartphone 1 is the first mode when the correction value used for the previous calibration is changed, invalidating the current correction value and changing the correction value again. The correction control code 9B, for example, makes it possible to determine that the travel mode is the first mode if the air pressure variation exceeds 0.3 hPa (hectopascals) in ten seconds before the correction value is changed and ten seconds after the correction value is changed. The method of changing the correction value that is executed again according to the correction control code 9B includes, for example, a method of returning the current correction value to the correction value used for the previous calibration, a method of changing the current correction value to an average of the correction values used in sets of calibrations in the past, and a method of returning the correction value to the default.

By executing the correction control code 9B, the controller 10 is able to, if it is determined that the travel mode of the smartphone 1 is the first mode when the correction value used in the previous calibration is changed, invalidate the current correction value and change the correction value again.

Figure 4:
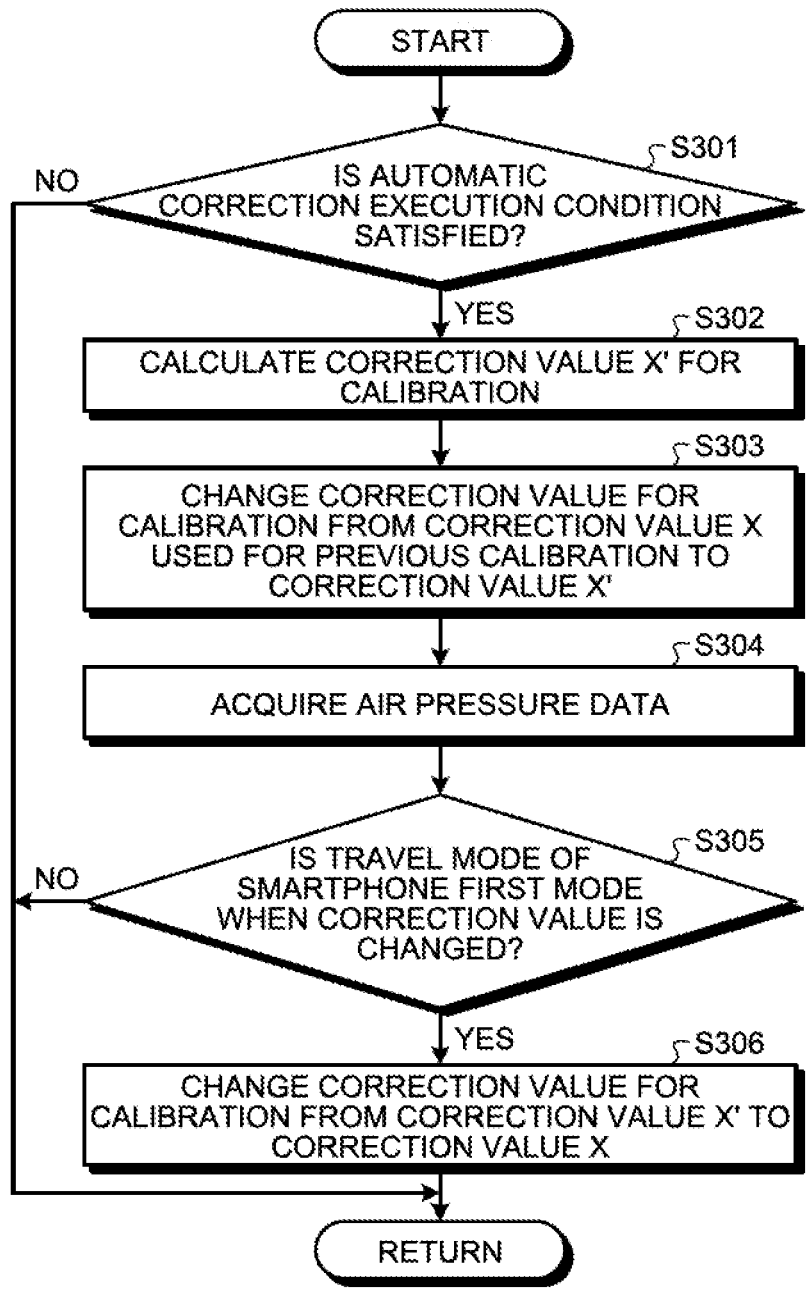
FIG. 4 is a flowchart illustrating still another exemplary process that is executed by the smartphone according to an embodiment of the disclosure.

With reference to FIG. 4, the process executed by the smartphone 1 according to an embodiment will be described. FIG. 4 is a flowchart illustrating still another exemplary process executed by the smartphone according to an embodiment. The controller 10 executes the control code 9A and the correction control code 9B that are stored in the storage 9, thereby achieving the process illustrated in FIG. 4.

As illustrated in FIG. 4, the controller 10 determines whether the automatic correction execution condition is satisfied (Step S301).

If the determination result indicates that the automatic correction execution condition is not satisfied (NO at Step S301), the controller 10 repeats the determining process of Step S301.

On the other hand, if the determination result indicates that the automatic correction execution condition is satisfied (YES Step S301), the controller 10 calculates a correction value X' for calibration (Step S302).

After calculating the correction value X' for calibration, the controller 10 changes the correction value for calibration from a correction value X used for the previous calibration to the correction value X' (Step S303).

The controller 10 then acquires the air pressure data 9D from the storage 9 (Step S304).

Based on the air pressure data 9D that is acquired at Step S304, the controller 10 determines whether the travel mode of the smartphone 1 is the first mode when the correction value is changed at Step S303 (Step S305).

If the determination result indicates that the travel mode of the smartphone 1 is the first mode (YES at Step S305), the controller 10 changes the correction value for calibration from the correction value X' to the correction value X again (Step S306) and returns to the determining process of Step S301 described above.

If the determination result indicates that the travel mode of the smartphone 1 is not the first mode (NO at Step S305), the controller 10 returns to the determining process of Step S301 described above as it is.

According to the process illustrated in FIG. 4, if the travel mode of the smartphone 1 is the first mode when the correction value is changed, the controller 10 changes the correction value for calibration again from the correction value X' calculated at Step S302 to the correction value X used for the previous calibration. Even after the correction value is changed, executing the process illustrated in FIG. 4 makes it possible to, in the smartphone 1, to avoid calibration using the correction value calculated in the mode where an unintended acceleration is applied to the smartphone 1 from being performed on the acceleration sensor 15.

In the process illustrated in FIG. 2, the smartphone 1 may further use GPS signals for the purpose of determining whether the travel mode of the smartphone 1 is the first mode.

The correction control code 9B enables provision of a function of, if it is determined that the travel mode of the smartphone 1 is not the first mode based on the detection result of the air pressure sensor 18 and GPS signals, changing the correction value for calibration under the condition that the absolute value of the difference between the correction value X used for the previous calibration and the correction value X' newly calculated exceeds a given value. The correction control code 9B enables calculation of the travel distance of the smartphone 1 based on GPS signals, calculation of the travel speed and the travel acceleration of the smartphone 1 from the travel distance and the time of travel, and the use of the travel speed and the travel acceleration as information supporting the fact that the travel mode of the smartphone 1 is the first mode. For example, the correction control code 9B makes it possible to, if a given air pressure variation is recognized from the detection result of the air pressure sensor 18, analyze the travel mode of the smartphone 1 from the travel speed of the smartphone 1 calculated with GPS signals, and if the analysis result indicates that a uniform accelerated motion is recognized, determine that the travel mode of the smartphone 1 is the first mode. By further using GPS signals, the correction control code 9B makes it possible to, for example, during travel with a transportation traveling horizontally at high speed, such as a bullet train or an airplane, accurately determine that the travel mode of the smartphone 1 is the first mode.

If it is determined that the travel mode of the smartphone 1 is not the first mode based on the detection result of the air pressure sensor 18 and the GPS signals, the controller 10 is able to change the correction value for calibration under the condition that the absolute value of the difference between the correction value X used for the previous calibration and the correction value X' newly calculated exceeds the given value.

Figure 5:
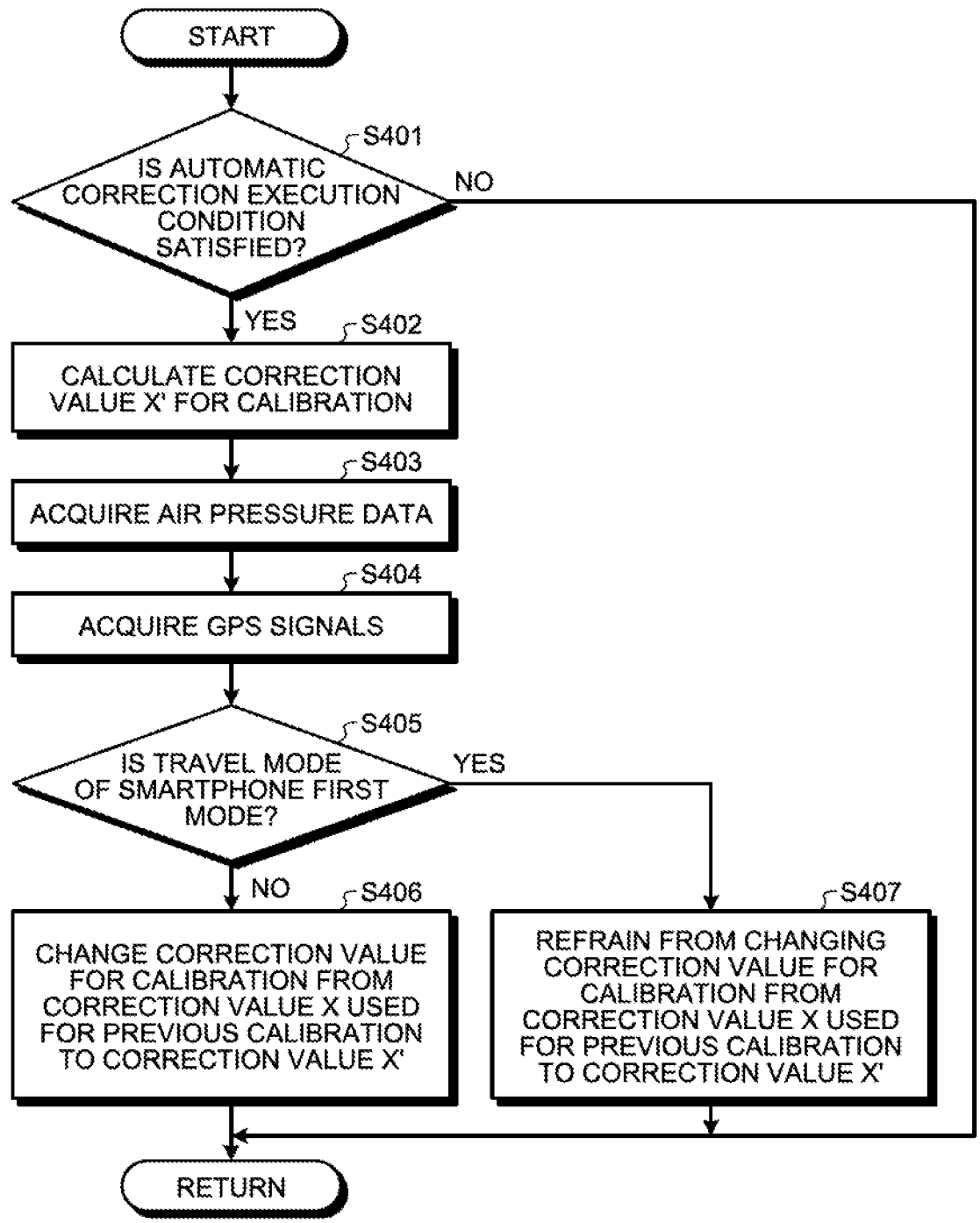
FIG. 5 is a flowchart illustrating still another exemplary process that is executed by the smartphone according to an embodiment of the disclosure.

With reference to FIG. 5, a process executed by the smartphone 1 according to an embodiment will be described. FIG. 5 is a flowchart illustrating still another exemplary process that is executed by the smartphone according to an embodiment. The controller 10 executes the control code 9A and the correction control code 9B that are stored in the storage 9, thereby achieving the process illustrated in FIG. 5. The process illustrated in FIG. 5 is different from the process illustrated in FIG. 2 in the aspect that the process includes Step S404.

As illustrated in FIG. 5, the controller 10 determines whether the automatic correction execution condition is satisfied (Step S401).

If the determination result indicates that the automatic correction execution condition is not satisfied (NO at Step S401), the controller 10 repeats the determining process of Step S401.

On the other hand, if the determination result indicates that the automatic correction execution condition is satisfied (YES at Step S401), the controller 10 calculates a correction value X' for calibration (Step S402).

After calculating the correction value X' for calibration, the controller 10 acquires the air pressure data 9D from the storage 9 (Step S403).

The controller 10 then acquires GPS signals from the GPS receiver 19 (Step S404).

The controller 10 determines whether the travel mode of the smartphone 1 is the first mode based on the air pressure data 9D acquired at Step S403 and the GPS signals acquired at Step S404 (Step S405).

If the determination result indicates that the travel mode of the smartphone 1 is not the first mode (NO at Step S405), the controller 10 changes the correction value for calibration from a correction value X used for the previous calibration to the correction value X' (Step S406) and returns to the determining process of Step S401 described above.

If the determination result indicates that the travel mode of the smartphone 1 is the first mode (YES at Step S405), the controller 10 does not change the correction value for calibration from the correction value X used for the previous calibration to the correction value X' (Step S407) and returns to the determining process of Step S401.

As in the case of the process illustrated in FIG. 5, in the process illustrated in FIG. 4, the smartphone 1 may further use GPS signals for the purpose of determining whether the travel mode of the smartphone 1 is the first mode.

When the correction control code 9B enables provision of a function of, if it is determined that the travel mode of the smartphone 1 is the first mode when the correction value used for the previous calibration is changed based on the detection result of the air pressure sensor 18 and the GPS signals, invalidating the current correction value and changing the correction value again.

By executing the correction control code 9B, the controller 10 is able to invalidate the current correction value and change the correction value again if it is determined that the travel mode of the smartphone 1 is the first mode when the correction value used for the previous calibration is changed based on the detection result of the air pressure sensor 18 and the GPS signals.

Figure 6:
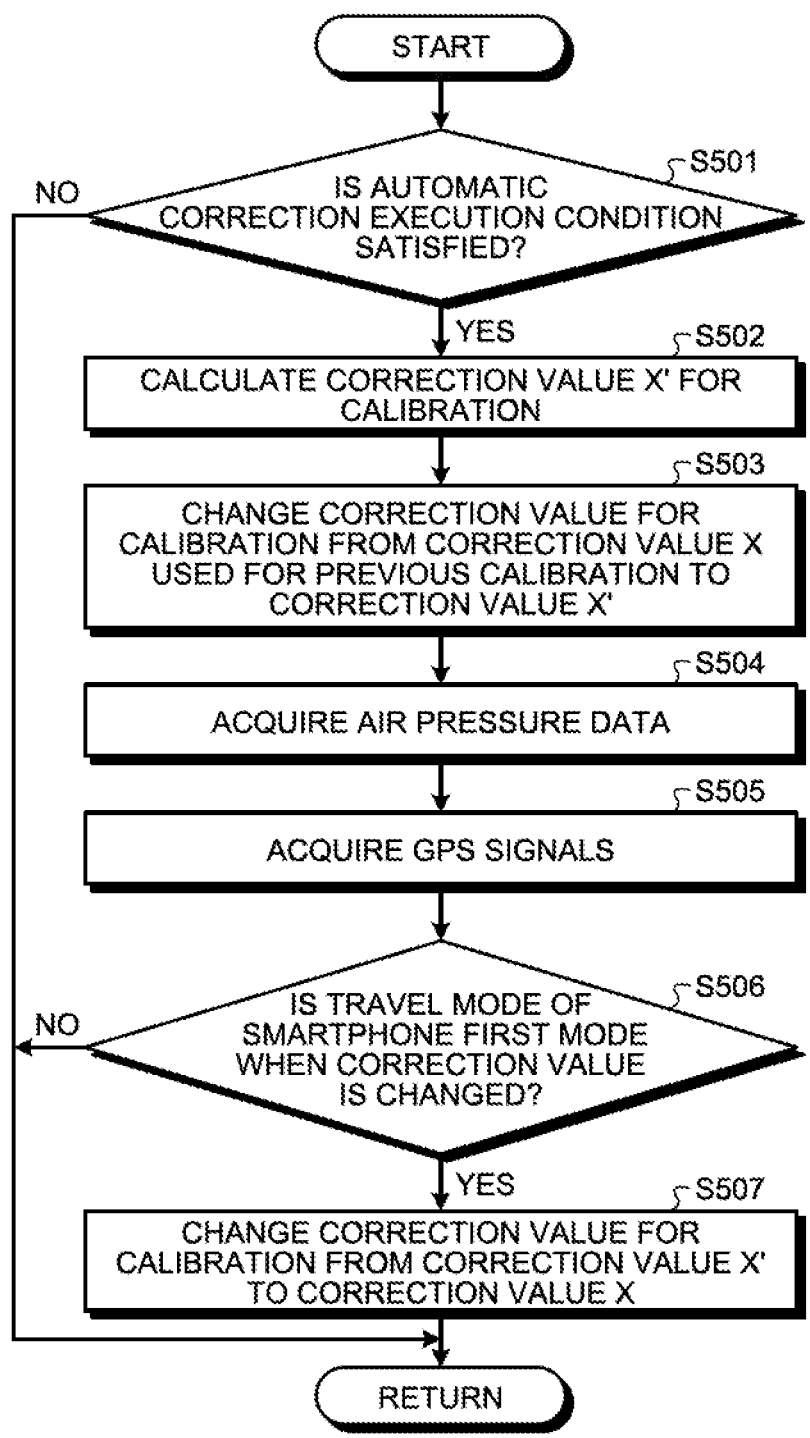
FIG. 6 is a flowchart illustrating still another exemplary process that is executed by the smartphone according to an embodiment of the disclosure.

With reference to FIG. 6, the process executed by the smartphone 1 according to an embodiment will be described. FIG. 6 is a flowchart illustrating still another exemplary process that is executed by the smartphone according to an embodiment. The controller 10 executes the control code 9A and the correction control code 9B that are stored in the storage 9, thereby achieving the process illustrated in FIG. 6. The process illustrated in FIG. 6 is different from the process illustrated in FIG. 4 in the aspect that the process includes Step S505.

As illustrated in FIG. 6, the controller 10 determines whether the automatic correction execution condition is satisfied (Step S501).

If the determination result indicates that the automatic correction execution condition is not satisfied (NO at Step S501), the controller 10 repeats the determining process at Step S501.

On the other hand, if the determination result indicates that the automatic correction execution condition is satisfied according to the determination result (YES at Step S501), the controller 10 calculates a correction value X' for calibration (Step S502).

After calculating the correction value X' for calibration, the controller 10 changes the correction value for calibration from a correction value X used for the previous calibration to the correction value X' (Step S503).

The controller 10 then acquires the air pressure data 9D from the storage 9 (Step S504).

The controller 10 then acquires GPS signals from the GPS receiver 19 (Step S505).

Based on the air pressure data 9D acquired at Step S504 and the GPS signals acquired at Step S505, the controller 10 determines whether the travel mode of the smartphone 1 is the first mode when the correction value is changed at Step S503 (Step S506).

If the determination result indicates that the travel mode of the smartphone 1 is the first mode (YES at Step S506), the controller 10 changes the correction value for calibration from the correction value X' to the correction value X again (Step S507) and returns to the determining process of Step S501 described above.

If the determination result indicates that the travel mode of the smartphone 1 is not the first mode (NO at Step S506), the controller 10 returns to the determining process of Step S501 describe above as it is.

In some embodiments as described above, the smartphone 1 may extract only a travel of elevator from among the travel modes of the smartphone 1 that can be determined as the first mode and may execute walking detection based on the detection result of the acceleration sensor 15 for the purpose of excluding travels of escalator and stairs. For example, even if it is determined that the travel mode of the smartphone 1 is the first mode from the air pressure variation, in the case where walking is detected, the smartphone 1 may determine that the travel mode does not correspond to the first mode and change the correction value.

Some embodiments exemplify the case where the mode where an unintended acceleration is applied to the smartphone 1 is determined based on the detection result of the air pressure sensor 18; however, embodiments are not limited thereto. In other words, the smartphone 1 may determine the mode where an unintended acceleration is applied to the smartphone 1 based on the detection result of the receiver that receives radio waves of positioning satellites. For example, if it is determined that the smartphone 1 has a uniform accelerated motion based on the detection result of the receiver that receives radio waves of positioning satellites, it may be determined an unintended acceleration is being applied to the smartphone 1. The travel speed of the smartphone 1 may be calculated from the Doppler effect of the received radio waves of the positioning satellites or may be calculated from the travel distance calculated from the radio waves of the positioning satellites and time taken for the travel. The receiver that receives the radio waves of the positioning satellites may be, for example, the GPS receiver 19, a global navigation satellite system (GLONASS) receiver, an Indian regional navigational satellite system (IRNSS) receiver, a COMPASS Galileo receiver, or a quasi-zenith satellite system (QZSS) receiver.

The smartphone 1 may perform near-field communication with a mobile object, such as a vehicle or an elevating machine that the user gets in, via the communicating unit 6 and acquire information containing the travel speed of the mobile object, acceleration of the mobile object or the like. If it is determined that the smartphone 1 has a uniform accelerated motion based on the acquired information containing, for example, the travel speed of the mobile object and the acceleration of the mobile object, the smartphone 1 may determine that an unintended acceleration is being applied to the smartphone 1. The vehicle includes automobiles, railroad vehicles, linear motorcars, roller coasters, and so on. The elevating machine includes elevators each of which houses human or baggage and moves at least in one of vertical, oblique and horizontal directions.

Although the present disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An electronic device comprising:
   a first sensor;
   a second sensor; and
   a controller configured to determine whether the electronic device is in a predetermined state based on a detection result of the first sensor, wherein the predetermined state includes a state of moving with a constant acceleration,
   wherein the controller is configured to, if it is determined that the electronic device is in the predetermined state, refrain from changing a correction value used to correct a detection error in the second sensor.

2. The electronic device according to claim 1, wherein the first sensor includes an air pressure sensor.

3. The electronic device according to claim 1, wherein the second sensor includes an acceleration sensor.

4. The electronic device according to claim 1, wherein the first sensor includes a receiver configured to receive radio waves of positioning satellites.

5. A correction control method of an electronic device including a first sensor and a second sensor, the correction control method comprising steps of:
   determining whether the electronic device is in a predetermined state based on a detection result of the first sensor, wherein the predetermined state includes a state of moving with a constant acceleration; and
   subsequent to the determining that the electronic device is in the predetermined state, refraining from changing a correction value used to correct a detection error in the second sensor.

6. An electronic device comprising:
   a first sensor;
   a second sensor; and
   a controller configured to determine whether the electronic device is in a predetermined state based on a detection result of the first sensor, wherein the predetermined state includes a state of moving with a constant acceleration, wherein the controller is configured to, if it is determined that the electronic device is in the predetermined state when a correction value used to correct a detection error in the second sensor is changed, change the correction value again.

7. The electronic device according to claim 6, wherein the first sensor includes an air pressure sensor.

8. The electronic device according to claim 6, wherein the second sensor includes an acceleration sensor.

9. The electronic device according to claim 6, wherein the first sensor includes a receiver configured to receive radio waves of positioning satellites.

* * * * *